(12) United States Patent
Chester (10) Patent No.: US 12,478,041 B1
(45) Date of Patent: Nov. 25, 2025

(54) CATTLE RUB OIL APPLICATOR

(71) Applicant: RC1 Engineered solutions, Dickson, TN (US)

(72) Inventor: Roger Chester, Dickson, TN (US)

(73) Assignee: RC1 Engineered Solutions, Dickson, TN (US)

( * ) Notice: Subject to any disclaimer, the term of this patent is extended or adjusted under 35 U.S.C. 154(b) by 0 days.

(21) Appl. No.: 18/917,364

(22) Filed: Oct. 16, 2024

(51) Int. Cl.
*A01K 13/00* (2006.01)

(52) U.S. Cl.
CPC .................. *A01K 13/0034* (2025.08)

(58) Field of Classification Search
CPC .. A01K 13/003; A01K 13/004; A01K 13/006; A01K 27/007; A01K 5/008; A01K 5/0128; A01K 5/01; A61D 7/00; B44D 3/125; B05C 17/0217; E04D 13/0641
See application file for complete search history.

(56) References Cited

U.S. PATENT DOCUMENTS

| | | | | |
|---|---|---|---|---|
| 1,050,712 A * | 1/1913 | Applegate | ............ | A01K 13/004 119/659 |
| 1,162,487 A * | 11/1915 | Ide | ............ | A01K 13/004 119/663 |
| 1,173,201 A * | 2/1916 | McDermand | ........ | A01K 13/004 119/659 |
| 1,204,707 A * | 11/1916 | Smith | ............ | A01K 13/004 119/663 |
| 1,209,832 A * | 12/1916 | George | ............ | A01K 13/004 119/663 |
| 1,213,682 A * | 1/1917 | Oliver | ............ | A01K 13/004 119/663 |
| 1,241,023 A * | 9/1917 | Rizk | ............ | A01K 13/004 119/659 |
| 1,252,256 A * | 1/1918 | Frink | ............ | A01K 13/004 119/659 |
| 1,727,610 A * | 9/1929 | Kramer | ............ | A01K 5/01 119/61.1 |
| 1,742,019 A * | 12/1929 | Williams | ............ | A01K 39/014 119/900 |

(Continued)

FOREIGN PATENT DOCUMENTS

| | | |
|---|---|---|
| CN | 114176416 A | 3/2022 |
| CN | 220255373 U | 12/2023 |

(Continued)

OTHER PUBLICATIONS

Brand: RELN; Title: "1.2m Trough Only"; Available on the date of search i.e., Aug. 29, 2024 Link: https://reln.com.au/products/1-2mtrough-only/.

(Continued)

*Primary Examiner* — Morgan T Jordan
*Assistant Examiner* — Danielle A Clerkley
(74) *Attorney, Agent, or Firm* — Jeremy Briggs (57) ABSTRACT

A device to apply backrubber solution on a livestock backrubber or strips is disclosed. The device may include a U-shaped elongated tube having a tube proximal end and a tube distal end. The device may further include a first end cap located at the tube proximal end and a second end cap located at the tube distal end. Each of the first end cap and the second end cap comprises a cut-out configured to removably attach the device to the livestock backrubber.

19 Claims, 5 Drawing Sheets

(56) References Cited

U.S. PATENT DOCUMENTS

| | | | | |
|---|---|---|---|---|
| 1,747,597 A | * | 2/1930 | Pheifer | A01K 13/004 |
| | | | | 119/663 |
| 1,749,808 A | * | 3/1930 | Greene | A01K 39/014 |
| | | | | 119/61.3 |
| 2,641,225 A | * | 6/1953 | Kirk | A01K 13/004 |
| | | | | 119/659 |
| 2,688,950 A | * | 9/1954 | McKinley | A01K 13/004 |
| | | | | 119/661 |
| 2,835,225 A | * | 5/1958 | Cline | A01K 13/004 |
| | | | | 156/247 |
| 4,870,926 A | * | 10/1989 | Smith | A01K 13/003 |
| | | | | 119/661 |
| 7,267,079 B1 | | 9/2007 | Larson | |
| 9,702,502 B2 | | 7/2017 | Hudepohl | |
| 10,631,521 B2 | | 4/2020 | Davis | |
| 2016/0136679 A1 | * | 5/2016 | Mitchell | B05C 17/0217 |
| | | | | 427/428.01 |
| 2022/0279752 A1 | * | 9/2022 | Schneider | A01K 5/008 |

FOREIGN PATENT DOCUMENTS

| | | | | | |
|---|---|---|---|---|---|
| GB | 450895 A | * | 7/1936 | | A01K 5/01 |
| GB | 1521684 A | * | 8/1978 | | A01K 5/01 |

OTHER PUBLICATIONS

Title:"Problems drawing a j slot" dated:Aug. 25, 2019.

* cited by examiner

CATTLE RUB OIL APPLICATOR

TECHNICAL FIELD

The present disclosure relates to a cattle rub oil applicator, and more specifically to an applicator for applying backrubber solution on a livestock backrubber or strips attached to the livestock backrubber.

BACKGROUND

A livestock backrubber is a solution application device typically used to apply backrubber solution to the back skin and fur of livestock. Backrubber solution often includes pesticide and/or medicinal substances suspended in an oil or another carrier. The backrubber solution is used to control parasites and promote animal health by reducing the effect of flies, grubs, lice, ticks, or other agricultural pests that may harm the livestock. The backrubber device often includes an absorbent rubbing surface, which is coated with a backrubber solution containing pesticide and/or medicinal substances. When the livestock (e.g., cattle, sheep, etc.) rub against the rubbing surface, the backrubber solution is applied on the livestock body. In most cases, the livestock realize over time that the solution provides relief from agricultural pests and they often seek out the backrubber as it hangs near water, mineral feeders, in alleyways or other high traffic areas.

Although there are various ways to apply the backrubber solution, the most common method for application includes using cloth strips or another flexible and absorbent material to apply the solution to the backs of livestock. In some cases, the caretaker or user may fashion a backrubber by suspending cloth or other absorbent materials around a rubbing surface, along a rubbing surface length. The user may further soak these cloth strips with the backrubber solution and hang the cloth strips. When the livestock cross or pass through the cloth strip, the backrubber solution may be applied on the livestock body (e.g., face, neck, back, etc.).

It is a common practice to place the backrubber with the strips in a tub or drum that may be placed on the ground, pour the backrubber solution over the backrubber/strips, and put or hook the backrubber in place (e.g., attach with posts/trees) after saturation with the backrubber solution, which may cause dripping and spillage. Further, this process may be difficult for the user to perform. Furthermore, when the user needs to re-soak the backrubber, the user may need to take the backrubber down, put the backrubber in the tub, pour the backrubber solution on it, soak it, then put or hook the backrubber again in place. Alternatively, the user may use a bottle to pour the backrubber solution on the backrubber, which may be time consuming, waste the backrubber solution and may not effectively soak the backrubber/strips. In addition, the cloth strips may break or otherwise disengage from the rubbing surface while performing such soaking/re-soaking operations.

Thus, there is a need for a system that enables the user to perform the soaking/re-soaking operations easily and effectively, without causing spillage or wastage of the backrubber solution.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

A backrubber device (or a "backrubber") is a device that applies a backrubber solution on a livestock body. The backrubber solution may include pesticide and/or medicinal substances suspended in an oil or another carrier, which may control parasites and promote animal health. The backrubber may include an absorbent rubbing surface that is made of an absorbent material that absorbs and distributes the backrubber solution. A user may soak or coat the rubbing surface with the backrubber solution. When the livestock (e.g., cattle, sheep, etc.) rubs against the rubbing surface, the backrubber solution may be applied on the livestock body.

The backrubber may further include a holding portion such as a rope, chain, cable, etc., on each end of the backrubber, which may attach/secure the backrubber to an external structure such as posts, trees, etc. In some aspects, the user may attach a plurality of strips (e.g., cotton strips) to the rubbing surface, along a rubbing surface length, and soak the strips with the backrubber solution to further increase the area of contact of the livestock body with the backrubber solution.

The present disclosure is directed to a backrubber solution application device (hereinafter referred to as "device") that the user may use to apply the backrubber solution on the backrubber and the plurality of strips attached to the backrubber. The user may removably attach the device with the holding portion (hereinafter referred to as "rope"), to enable the device to hold the rubbing surface inside the device, thereby allowing the backrubber and the strips to effectively soak or re-soak the backrubber solution that the user pours on the backrubber and the strips during the soaking/re-soaking operation.

The device may include an elongated "U-shaped" tube or trough. The tube may be hollow and made of rigid material such as Polyvinyl chloride (PVC) or plastic material. A tube length may be equivalent to a backrubber length (or a rubbing surface length), to enable the user to position the backrubber completely inside the tube during soaking/re-soaking operation. The tube may have a predetermined diameter that enables the backrubber to fit snuggly inside the tube to effective soak the backrubber solution that the user pours on the backrubber, thereby preventing backrubber solution spilling and wastage.

The device may further include a first end cap and a second end cap. The first end cap may be positioned at a tube proximal end, and the second end cap may be positioned at a tube distal end. The end caps may be "U-shaped" caps that may close the tube proximal end and the tube distal end. The first end cap and the second end cap may be attached at the tube proximal end and the tube distal end via a fastening mechanism such as an adhesive. In further aspects, the first end cap and the second end cap may be molded into the tube or trough.

Each end cap may include a cut-out that enables the user to removably attach the device to the rope that suspends the backrubber. In some aspects, the cut-out may be "J-shaped". In further aspects, the cut-out may include a first portion, a second portion, and a third portion. The first portion may be a vertical portion having a first portion longitudinal axis perpendicular to a tube longitudinal axis. The second portion may be a horizontal portion attached to a vertical portion bottom end, to form an "L-shaped" cut-out. A second portion proximal end may be connected to the vertical portion bottom end and a second portion distal end may be connected to the third portion, which may be a round portion.

To attach the device to the rope, the user may insert the rope in the vertical portion, slide the rope from the vertical portion to the horizontal portion, and then to the round portion that may hold the rope and may not allow the rope to come out of the device. The user may attach the device to the rope when the user desires to perform the soaking/re-soaking operation.

To perform the soaking/re-soaking operation, the user may first install the backrubber in place (e.g., attach the backrubber to an external structure such as trees, posts, etc.), and attach the device to the rope without removing or moving the backrubber. When the user attaches the device to the rope, the backrubber/strips may rest inside the tube. Thereafter, the user may pour the backrubber solution on the backrubber/strips, and saturate the backrubber/strips. When the soaking/resoaking operation is complete, the user may detach the device from the rope (e.g., move the rope out of the cut-out).

The present disclosure discloses a device that may assist the user to perform the soaking/resoaking operation quickly and conveniently. The device may further enable the user to pour the backrubber solution on the backrubber/strips without causing any spillage or wastage, thereby saving resources.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
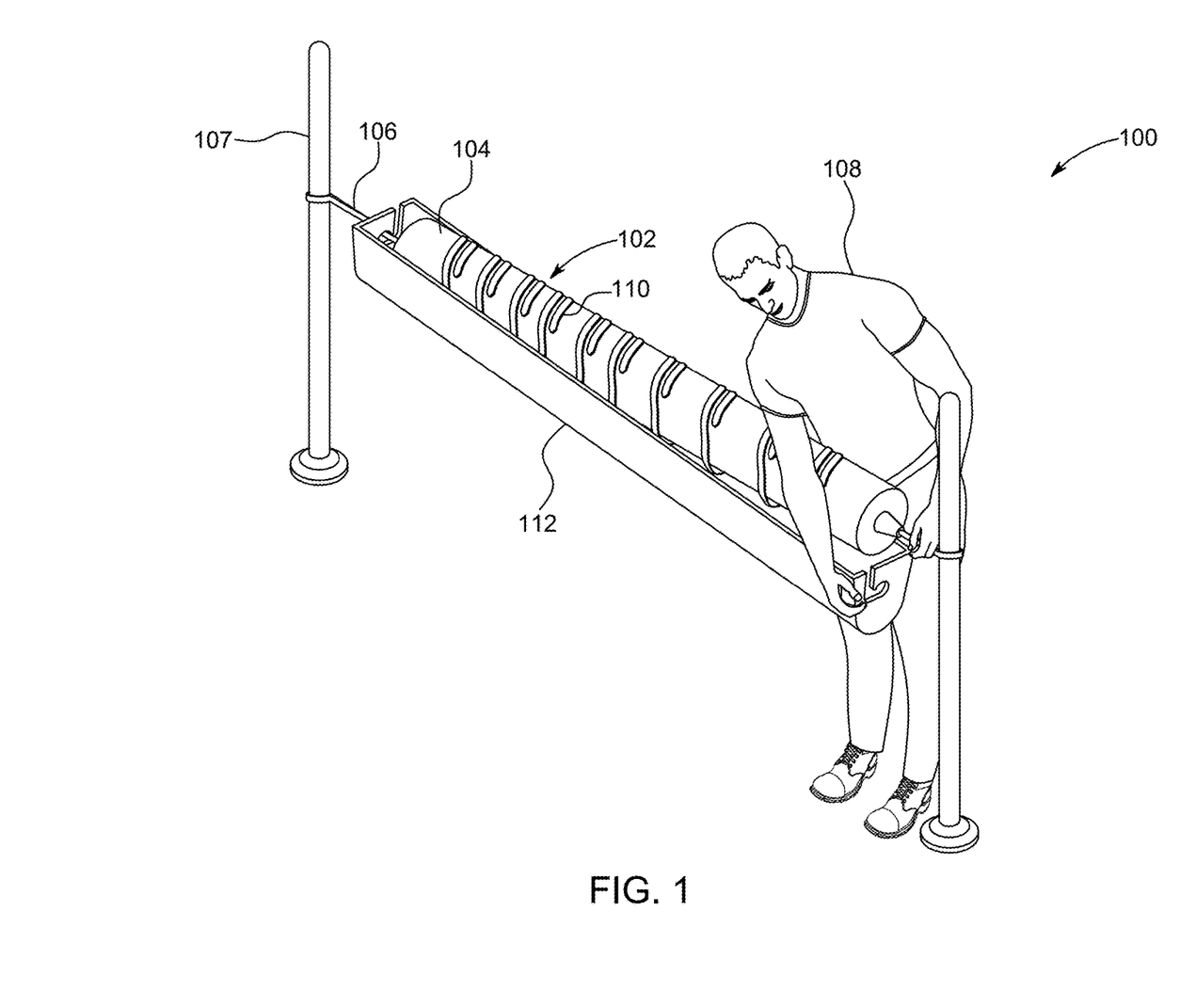
FIG. 1 depicts an environment in which techniques and structures for providing the systems and methods disclosed herein may be implemented.

FIG. 1 depicts an environment 100 in which techniques and structures for providing the systems and methods disclosed herein may be implemented. FIG. 1 will be described in conjunction with FIGS. 2, 3, 4, and 5.

The environment 100 may include a backrubber 102 that may control parasites and promote animal health. The backrubber 102 may be a horizontal bar having an absorbent rubbing surface 104 (hereinafter referred to as rubbing surface 104) that may include absorbent material configured to absorb and distribute a backrubber solution (described below in the described). In some aspects, the rubbing surface 104 may be made of a shredded cloth stuffed into a long sock type sleeve. The rubbing surface 104 may apply the backrubber solution to a body of a livestock (e.g., cattle, sheep, etc.), when the livestock rubs the livestock body against the rubbing surface 104. In some aspects, the rubbing surface 104 may be padded to provide comfort to the livestock when the livestock rubs the livestock body against the rubbing surface 104.

The backrubber 102 may further include a holding portion such as a rope/chain/cable 106 (hereinafter referred as rope 106) that may attach/secure the backrubber 102 to external structures 107 (e.g., poles, trees, posts, etc.). In some aspects, the rope 106 may be part of the backrubber 102. In other aspects, the rope 106 may not be part of the backrubber 102, but connected to the backrubber 102.

The backrubber solution may include pesticide and/or medicinal substances suspended in an oil or another carrier, which may control parasites and promote animal health. In some aspects, the pesticide or medicinal substance may include, but is not limited to, Petroleum Distillates, Permethrin, Piperonyl Butoxide (PBO), and/or the like, in any ratio. For instance, the pesticide or medicinal substance may include 0.125% Permethrin and 0.125% PBO for lactating and non-lactating dairy cattle, beef cattle, and swine to control flies, mosquitoes, ticks, and lice. The pesticide or medicinal substance may kill flies, lice, mosquitoes, etc. The backrubber 102 may be of any length. In some aspects, the backrubber 102 may have a length of 60 inches or 120 inches (or more or less).

A user 108 may secure the backrubber 102 to the external structure 107 at a suitable height from the ground to allow the livestock to pass underneath the backrubber 102, and also allow the livestock to rub the livestock body against the rubbing surface 104. In an exemplary aspect, the user 108 may install the backrubber 102 at a position/location (e.g., feeding/watering area) where the livestock travels frequently.

The environment 100 may further include a plurality of strips 110 that the user 108 may removably attach to the backrubber 102. The strips 110 may be made of cloth/fabric (e.g., cotton or other absorbent cloth). The user 108 may attach the strips 110 to the rubbing surface 104 throughout a rubbing surface length. The user 108 may position each strip at a predetermined distance from adjacent strips. In some aspects, the predetermined distance may be in a range of 4-10 inches. Each strip may include a strip proximal end and a strip distal end. The user 108 may tie the strip proximal end to the rubbing surface 104, and keep the strip distal end hanging down. In some aspects, the user 108 may coat/soak the strips 110 with the backrubber solution to apply the pesticide or medicinal substance on the livestock body (e.g., face, neck, back, etc. of the livestock) when the livestock crosses or passes through the strips 110. It may be appreciated that the use of the strips 110 increases the area of contact of the livestock body with the backrubber solution, and may hence increase the insect or pesticide control.

The environment 100 may further include a backrubber solution application device 112 (hereinafter referred as device 112) that the user 108 may use to apply the backrubber solution to the rubbing surface 104 and/or the strips 110. The user 108 may removably attach the device 112 to the backrubber 102. Specifically, the user 108 may removably attach the device 112 to the rope 106 during the backrubber soaking or re-soaking operation. For example, the user 108 may removably attach the device 112 to the rope 106 to hold the backrubber 102 (e.g., the rubbing surface 104) inside the device 112 to allow the backrubber 102 and the strips to effectively soak or resoak the backrubber solution poured during the soaking/resoaking operation. The user 108 may removably attach the device 112 to the backrubber 102 when the user 108 desires to apply the backrubber solution on the backrubber 102 and/or the strips 110. After applying the backrubber solution, the user 108 may detach the device 112 from the backrubber 102. Thus, the user 108 may perform the soaking or resoaking operation while the backrubber 102 may be installed at its operating location (e.g., while the backrubber 102 is secured to the external structure 107), and without moving the backrubber 102 from the operating location to any other soaking/resoaking location.

Figure 2:
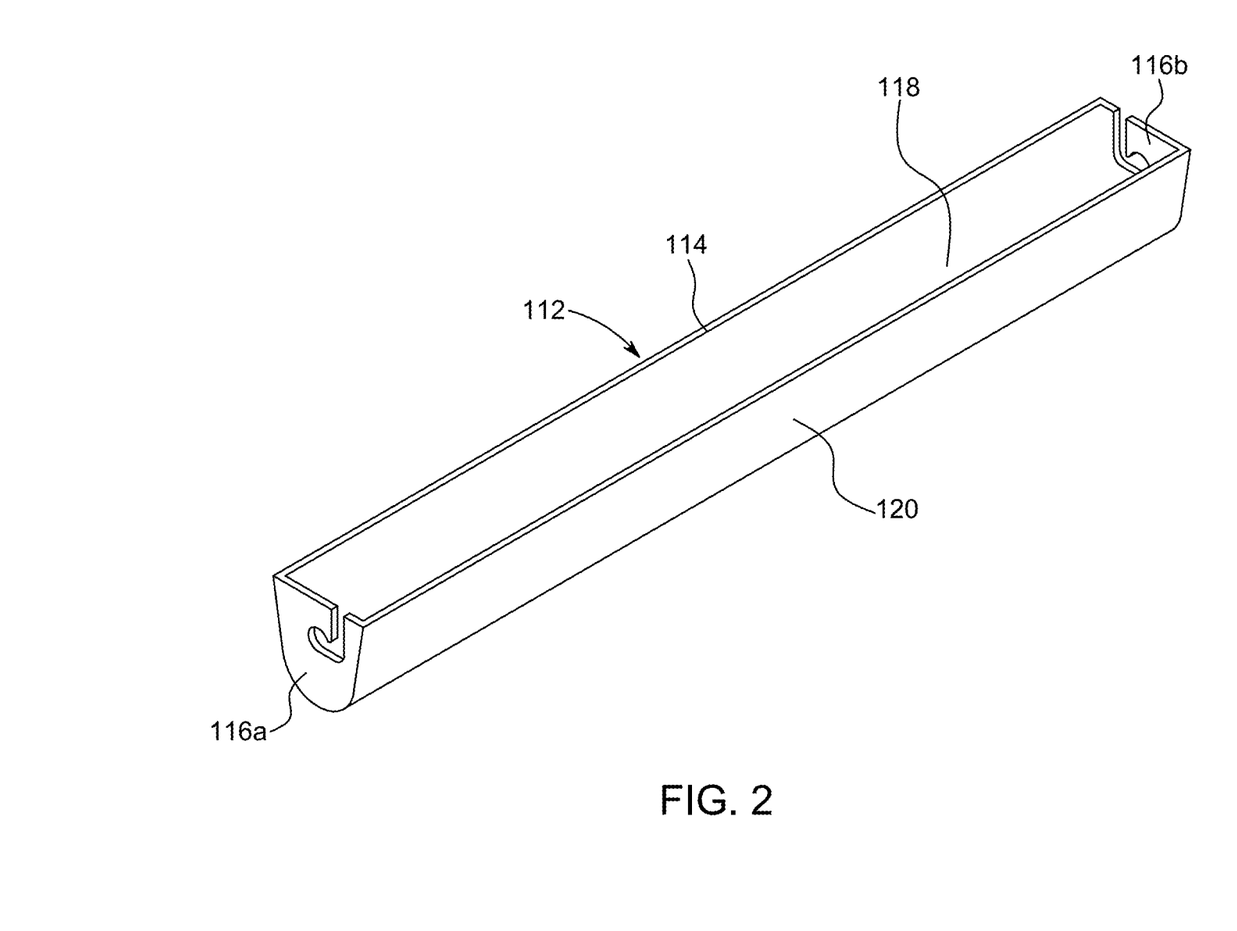
FIG. 2 depicts an isometric view of an example device to apply backrubber solution on a backrubber in accordance with the present disclosure.

The device 112 may be a trough having an elongated tube 114, a first end cap 116a, and a second end cap 116b, which are connected to form a continuous unified piece (as shown in FIG. 2). The device 112 may not include any moving components and may be a rigid structure. The device 112 may be made of any material. In some aspects, the device 112 may be made of Polyvinyl chloride (PVC) or plastic material, which may not degrade from the contact of the backrubber solution.

In some aspects, the elongated tube 114 may be a "U-shaped" elongated tube having a tube proximal end and a tube distal end. The elongated tube 114 may be a half round elongated tube or semi-cuboidal hollow tube/cylinder. The elongated tube 114 may include an interior surface 118 and an exterior surface 120. The interior surface 118 may receive the backrubber 102 during the soaking/resoaking operation. During the soaking/resoaking operation, the user 108 may pour backrubber solution on the backrubber 102 and the strips 110, after the interior surface 118 receives the backrubber 102 and the strips 110. The interior surface 118 may receive the backrubber 102 when the user 108 removably attaches the device 112 to the backrubber 102. In some aspects, the interior surface 118 may be concave shaped so that the interior surface 118 matches the curvature of the backrubber 102 (or the rubbing surface 104) to better facilitate the wicking effect of the backrubber 102 to soak up the backrubber solution. The exterior surface 120 may be opposite to the interior surface 118, and may face the ground when the user 108 removably attaches the device 112 to the backrubber 102.

Figure 3:
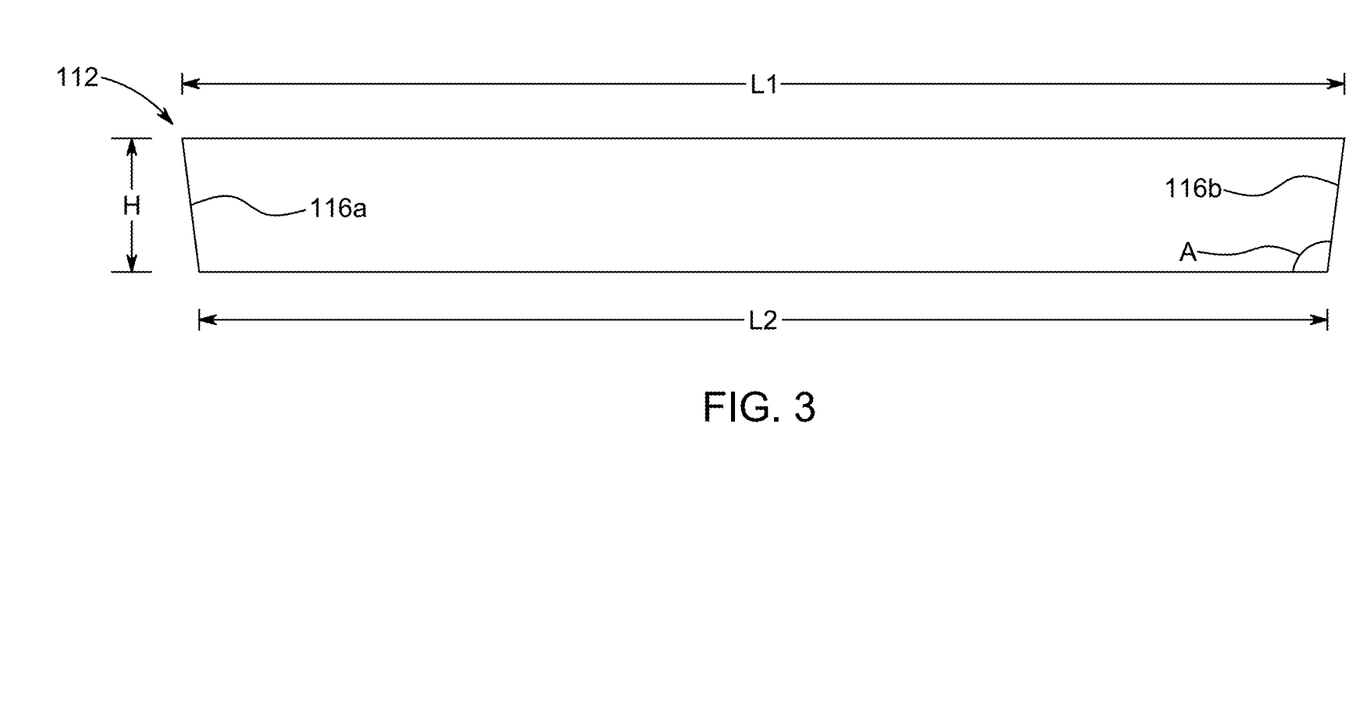
FIG. 3 depicts a side view of the device of FIG. 2 in accordance with the present disclosure.

In some aspects, the elongated tube 114 may be of any dimensions. In some aspects, the elongated tube 114 may have a length that may be equivalent to a backrubber length (or a rubbing surface length), which enables the device 112 to effectively receive the entire backrubber 102. For instance, the elongated tube length may be 120 inches (or 60 inches). In alternative aspects, the elongated tube length may be slightly greater than the backrubber 102 length. In further aspects, an elongated tube top length "L1" may be greater than an elongated tube bottom length "L2", as shown in FIG. 3. For instance, the elongated tube top length "L1" may be 120 inches and the elongated tube bottom length "L2" may be 119 inches. The difference between the elongated tube top length "L1" and the elongated tube bottom length "L2" facilitates the device 112 to stack with other similar devices during shipping/transportation/storage. Furthermore, the elongated tube 114 walls may have any thickness. For instance, the elongated tube 114 walls may have a thickness in a range of 0.20-0.30 inches. In an exemplary aspect, the elongated tube 114 walls may have a thickness of 0.237 inches. Such thickness range is optimal because if the thickness of the elongated tube 114 walls is greater, then the device 112 gets too heavy and will be harder for one person to handle. If the thickness of the elongated tube 114 walls is thin, the device 112 would not be rigid enough to stay straight and support the weight of a wet backrubber without buckling under the load.

In further aspects, an elongated tube depth (i.e., a distance between the top edges 121a, 121b of the elongated tube 114 and the bottom most point of the elongated tube 114) may be in a range of 5-6 inches. In an exemplary aspect, the elongated tube depth may be 5.5 inches, which enables the elongated tube 114 to completely receive and snuggly fit the different width rubbing surfaces 104. In addition, a distance "R1" between opposing elongated top edges 121a, 121b of the elongated tube 114 may be greater than a diameter "R2" of an elongated tube bottom portion. For instance, the distance "R1" may be in a range of 5-6 inches and the diameter "R2" may be in a range of 4-5 inches. In an exemplary aspect, the distance "R1" may be 5.5 inches and the diameter "R2" may be 4.5 inches. Such structure and dimensions enable the elongated tube 114 to completely receive and snuggly fit the different width rubbing surfaces 104 inside the device 112, and allow easy movement of the backrubber 102 into and out from the elongated tube 114. Since the user 108 fits the rubbing surface 104/strips 110 inside the device 112, the rubbing surface 104/strips 110 may soak all the backrubber solution that the user 108 puts on the backrubber 102, thereby preventing any wastage. In addition, such structure and dimensions facilitate the device 112 to stack with other similar devices during shipping/transportation/storage.

The first end cap 116a may be located at the tube proximal end and the second end cap 116b may be located at the tube distal end, to close the tube proximal end and the tube distal end. The first end cap 116a and the second end cap 116b may be used to seal the tube proximal end and the tube distal end. In some aspects, a plane associated with the first end cap 116a and the second end cap 116b may be perpendicular to an elongated tube longitudinal axis. In some aspects, the first end cap 116a and the second end cap 116b may have shapes and sizes that correspond to the shape and size of the elongated tube 114. In some aspects, the first end cap 116a and the second end cap 116b may be "U-shaped" having a height "H" that may be equivalent to the elongated tube depth. For instance, the endcap height "H" may be in a range of 5-6 inches. In an exemplary aspect, the endcap height "H" may be 5.5 inches. In addition, an endcap width may be in range of 5-6 inches. In an exemplary aspect, the endcap width may be 5.5 inches.

In some aspects, the first end cap 116a may be disposed parallel to the second end cap 116b. Stated another way, a first end cap plane may be parallel to a second end cap plane. In this scenario, the first end cap plane and the second end cap plane may be perpendicular to the tube longitudinal axis. In alternative aspects, the first end cap 116a and the second end cap 116b may be slanted relative to each other (e.g., slanted 0.5 inches from the tube bottom end to the tube top end), as shown in FIG. 3. The first end cap 116a and the second end cap 116b may be slanted outward away from the elongated tube 114. In such scenario, each end cap may be disposed at an angle "A" (which may not be 90 degrees) relative to a tube bottom portion/tube longitudinal axis or the ground. In this case, the angle "A" may be slightly greater than 90 degrees. For instance, the angle "A" may be between 95-100 degrees. The first end cap 116a and the second end cap 116b may be slanted so that the backrubber 102 (along with the strips 110) may lay snug in the bottom of the device 112 and soak up the backrubber solution. Further, the slanted end caps enable the user 108 to conveniently tie/attach the device 112 to the backrubber 102 via the end caps 116, 116b.

In addition, the slanted end caps and the distance/diameter "R1" and "R2" allow the device 112 to stack with other similar devices during shipping/transportation. In some aspects, the elongated tube top length "L1" may be greater than the elongated tube bottom length "L2" due to the slanting of the first end cap 116a and the second end cap 116b.

In further aspects, the first end cap 116a and the second end cap 116b may be attached to the tube proximal end and the tube distal end via a fastening mechanism. In an exemplary aspect, the fastening mechanism may be an adhesive. In other aspects, the fastening mechanism may include welding, connection using fasteners such as screws, bolts, etc. In further aspects, the first end cap 116a and the second end cap 116b may be molded into the elongated tube 114.

Figure 4:
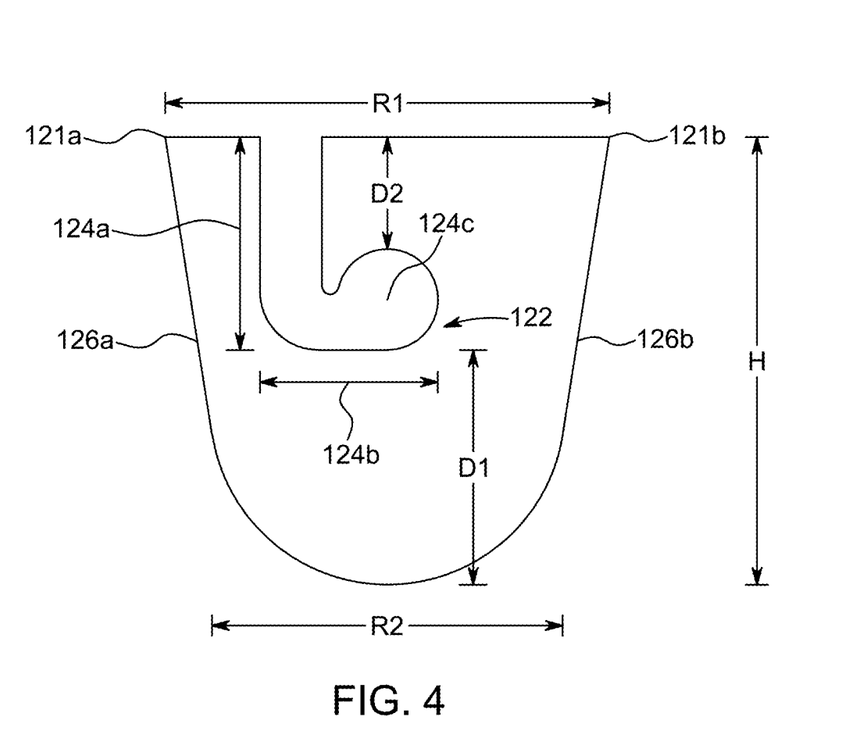
FIG. 4 depicts an example cut-out on an end cap of the device of FIG. 2, in accordance with the present disclosure.

Each of the first end cap 116a and the second end cap 116b may include a cut-out 122 which may enable the user 108 to removably attach the device 112 with the backrubber 102. Specifically, the cut-out 122 may engage with the rope 106 to removably attach the device 112 with the backrubber 102.

In some aspects, the cut-out 122 may be "J-shaped". In further aspects, the cut-out 122 may include a first portion 124a, a second portion 124b, and a third portion 124c (as shown in FIG. 4), which may be configured to receive the rope 106 and hold the rope 106, thereby enabling the device 112 to removably attach to the backrubber 102. In some aspects, the first portion 124a may be disposed perpendicular to the second portion 124b. Stated another way, a first portion longitudinal axis may be perpendicular to a second portion longitudinal axis. In some aspects, the first portion 124a may include a first portion top end and a first portion bottom end, and the second portion 124b may include a second portion proximal end and a second portion distal end. The second portion proximal end may be connected to the first portion bottom end, and the second portion distal end may be connected to the third portion 124c. In some aspects, the third portion 124c may include a round portion, as shown in FIG. 4. The round portion may be a circular or semicircular through-hole.

In some aspects, the first portion longitudinal axis may be perpendicular to the tube longitudinal axis. Further, the first portion 124a may be disposed in proximity to a first side wall 126a of the elongated tube 114. Stated another way, a distance between the first portion 124a and the first side wall 126a is less than a distance between the first portion 124a and a second side wall 126b of the elongated tube 114. The first and second side walls 126a, 126b may be opposite or opposing walls of the elongated tube 114, as shown in FIG. 4. The first portion 124a may be offset (or closer) to one side so that the third portion 124c (that may secure the rope 106 when the device 112 may be attached to the rope 106) may be located at a center position in the end caps 116a, 116b. This is necessary so the device 112 hangs straight with the backrubber 102 that may be laying in it. so as to not have spillage or allow the backrubber 102 to fall out. Also it is necessary so that there is enough material located around and over the third portion 124c and the device 112 has the strength to suspend a wet backrubber and not break.

In further aspects, the first portion top end may be located at an end cap top end. The first portion top end may be configured to receive the rope 106. In some aspects, a first portion height may be in a range of 2-3 inches. In an exemplary aspect, the first portion height may be 2.62 inches. In further aspects, a first portion width may be equivalent to or slightly greater than a standard rope diameter. In some aspects, the first portion width may be in a range of 0.5-1 inches. In an exemplary aspect, the first portion width may be 0.75 inches, which enables the first portion 124a to receive the rope 106.

In some aspects, the second portion longitudinal axis may be perpendicular to the tube longitudinal axis, and be parallel to the ground. In some aspects, the second portion proximal end (that is connected to the first portion bottom end) may be located in proximity to the first side wall 126a. In some aspects, the second portion proximal end may overlap with the first portion bottom end. The second portion distal end may be located in an end cap middle portion. Stated another way, the second portion distal end may be equidistant from the first side wall 126a and the second side wall 126b. In some aspects, the second portion 124b may be located at a predefined distance "D1" (which may be in a range of 1-2 inches) from an end cap bottom end. The first portion 124a and second portion 124b may be connected to form an "L-shaped" cut-out.

In further aspects, as described above, the third portion 124c may be connected to the second portion distal end, which may be configured to hold the rope 106 when the user 108 attaches the device 112 to the backrubber 102. The third portion 124c may include a round portion having a round portion diameter that may correspond to the rope diameter. In some aspects, the round portion diameter may be in range of 1-2 inches. In an exemplary aspect, the round portion diameter may be 1.25 inches. In further aspects, the round portion diameter may be less than the first portion height. In some aspects, the round portion may be located in the end cap middle portion. Stated another way, the third portion 124c may be equidistant from the first side wall 126a and the second side wall 126b. Such an arrangement of the round portion/third portion 124c enables the round portion to robustly secure the rope 106. In some aspects, the third portion 124c may be located at a predefined distance "D2" from an end cap top end.

Such positioning of the first portion 124a, the second portion 124b and the third portion 124c as described above may enable the user 108 to position the device 112 in a stable manner (or enable balancing of the device 112) when the user 108 connects the device 112 to the backrubber 102 or the rope 106. When the user 108 positions the rope 106 in the third portion 124c, the rope 106 may not slide and may position the device 112 in a stable manner. In addition, the round portion may hold a single rope, and may even hold two ropes simultaneously. In addition, the cut-out 122 on the first end cap 116a and the second end cap 116b may be located on opposite sides. Stated another way, the first portion 124a associated with the cut-out 122 on the first end cap 116a may be towards the first side wall 126a, and the first portion 124a associated with the cut-out 122 on the second end cap 116b may be towards the second side wall 126b. This is necessary so that the device 112 hangs straight and may not flip over, and the rope 106 is not off centered in the device 112.

In operation, the user 108 may first attach the backrubber 102 to the external structure 107 such as trees, posts, etc., via the rope 106 (or the external rope/cable), at a suitable height from the ground. The user 108 may then tie the strips 110 on the rubbing surface 104 (along the entire rubbing surface length) in the manner described above. Responsive to attaching the strips 110 on the rubbing surface 104, the user 108 may initiate the soaking process. In this process, the user 108 may first coil the strips 110 on the rubbing surface 104 such that the strips 110 may not hang from the rubbing surface 104, and both the backrubber 102 and the strips 110 may be placed in the device 112 for the soaking/resoaking operation. Thereafter, the user 108 may attach the device 112 to the backrubber 102 (specifically the rope 106), via the cut-out 124 located on the first end cap 116a and the second end cap 116b.

Figure 5:
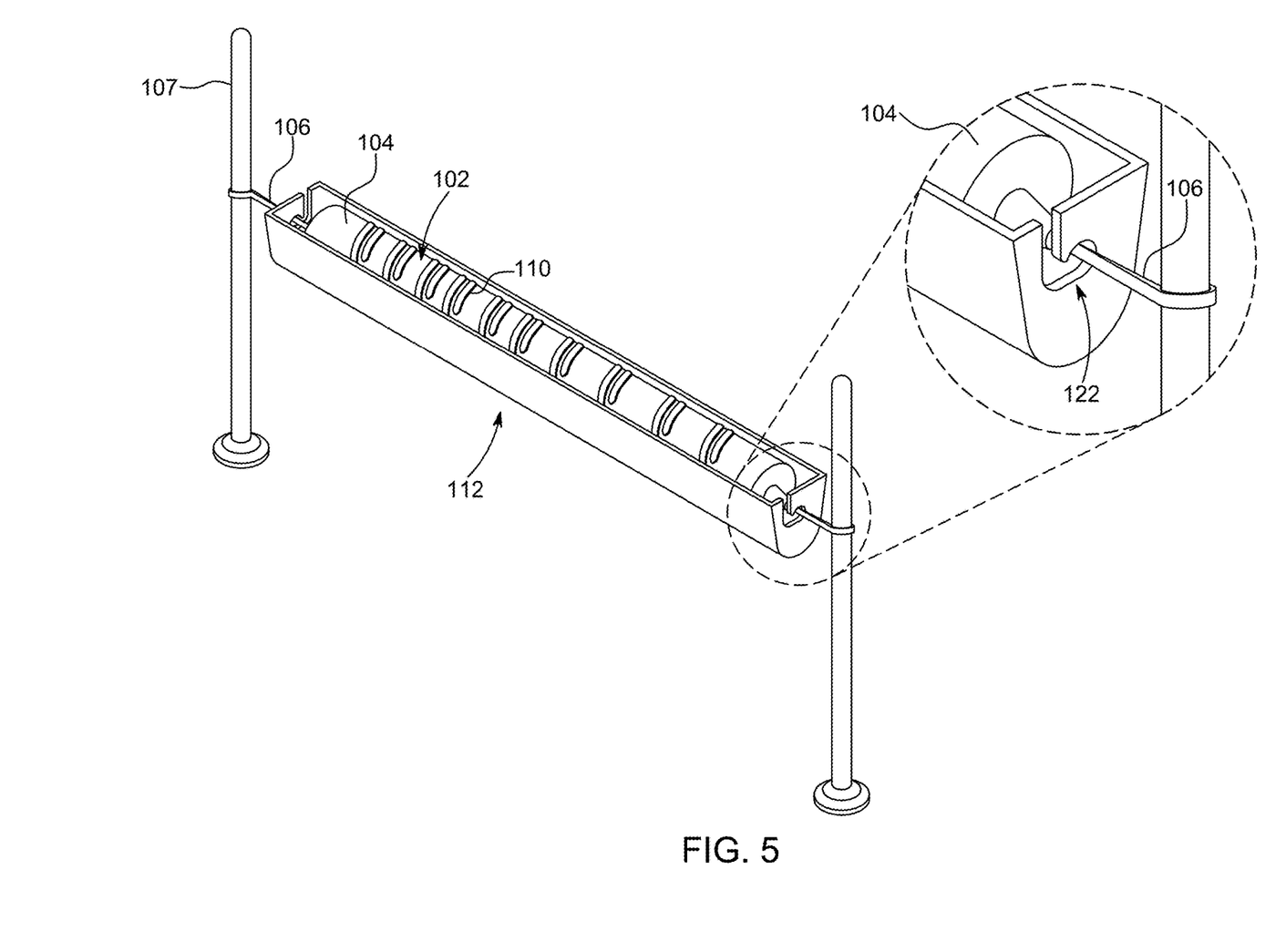
FIG. 5 depicts an example connection of a cut-out with a backrubber, in accordance with the present disclosure.

To attach the device proximal end to the backrubber 102 (e.g., to the backrubber proximal end) via the cut-out 122 associated with the first end cap 116a, the user 108 may insert the rope 106 in the first portion 124a via the first portion top end, drag or slide the rope 106 from the first portion top end to the first portion bottom end, and then from the second portion proximal end to the second portion distal end, and finally to the third portion 124c, as shown in FIG. 5. Similarly, the user 108 may attach the device distal end to the backrubber 102 (e.g., to the backrubber distal end) via the cut-out 122 associated with the second end cap 116b.

When the device 112 is attached to the backrubber 102, the user 108 may manually pour the backrubber solution by using a bottle on the backrubber 102 and the strips 110. The user 108 may then saturate the backrubber 102 and the strips 110 with the backrubber solution. When the backrubber 102 and the strips 110 are saturated, the user 108 may detach the device 112 from the backrubber 102 or the rope 106, by taking out the rope 106 from the cut-out 122 associated with the first end cap 116a and the second end cap 116b. To detach the device 112, the user 108 may move the rope 116 from the third portion 124c towards the second portion 124b, slide the rope 106 from the second portion distal end to the second portion proximal end, and then slide the rope 106 from the first portion bottom end to the first portion top end. The user 108 may then uncoil the strips 110 and hang them. The livestock may then pass underneath the backrubber 102/strips 110 and rub their face, neck, back and sides, which may keep horn flies and other pest from biting the livestock.

In further aspects, the user 108 may attach the device 112 to a pumping mechanism (not shown) or any other mechanism that may distribute the backrubber solution automatically from a backrubber solution reservoir to the backrubber 102/strips 110 that is placed inside the device 112 (via the end caps 116a, 116b, as described above), thereby enabling automatic soaking/resoaking operation. The backrubber solution reservoir may be disposed on the ground. In some aspects, the pumping mechanism may spray the backrubber solution on the backrubber 102/strips 110 when the user 108 positions the backrubber 102/strips 110 inside the device 112.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system comprising:
   a livestock backrubber having a rope that attaches the livestock backrubber to an external item;
   a device configured to removably attach to the livestock backrubber, wherein the device comprises:
      a U-shaped elongated tube having a tube proximal end and a tube distal end;
      a first end cap located at the tube proximal end; and
      a second end cap located at the tube distal end,
      wherein each of the first end cap and the second end cap comprises a cut-out configured to removably attach the device to the livestock backrubber, wherein the cut-out comprises:
         a first portion having a first portion top end and a first portion bottom end;
         a second portion connected to the first portion bottom end, wherein the second portion comprises a second portion proximal end and a second portion distal end, and wherein the second portion proximal end is connected to the first portion bottom end; and a third portion connected to the second portion distal end, wherein the third portion is round in shape to secure the rope to removably attach the device to the livestock backrubber, wherein the first portion is offset to a first side of the first end cap or the second end cap and the third portion is located at a center portion of the first end cap or the second end cap.

2. The system of claim 1, wherein the device is made of Polyvinyl chloride (PVC).

3. The system of claim 1, wherein the device is a continuous piece.

4. The system of claim 1, wherein the cut-out is J-shaped.

5. The system of claim 1, wherein a first portion longitudinal axis is perpendicular to a second portion longitudinal axis.

6. The system of claim 1, wherein a first portion height is in a range of 2-3 inches.

7. The system of claim 1, wherein a first portion width is in a range of 0.5-1 inches.

8. The system of claim 1, wherein a round portion diameter is in a range of 1-2 inches.

9. The system of claim 1, wherein an elongated tube bottom diameter is in a range of 4-5 inches.

10. The system of claim 1, wherein a distance between opposing elongated top edges of the U-shaped elongated tube is in a range of 5-6 inches.

11. The system of claim 1, wherein an elongated tube depth is in a range of 5-6 inches.

12. The system of claim 1, wherein the first end cap and the second end cap are slanted outward away from a U-shaped elongated tube body.

13. The system of claim 1, wherein an elongated tube top length is greater than an elongated tube bottom length.

14. The system of claim 13, wherein the elongated tube top length is 120 inches and elongated tube bottom length is 119 inches.

15. The system of claim 1, wherein the first end cap and the second end cap are connected to the tube proximal end and the tube distal end via a fastening mechanism.

16. The system of claim 15, wherein the fastening mechanism comprises an adhesive.

17. The system of claim 1, wherein the first portion top end is an open end that receives the rope to removably attach the device to the livestock backrubber.

18. A system comprising:
a livestock backrubber having a rope that attaches the livestock backrubber to an external item;
a device configured to removably attach to the rope of the livestock backrubber, wherein the device comprises:
a U-shaped elongated tube having a tube proximal end and a tube distal end;
a first end cap located at the tube proximal end; and
a second end cap located at the tube distal end,
wherein each of the first end cap and the second end cap comprises a cut-out configured to removably attach the device to the livestock backrubber, and
wherein the cut-out comprises:
a first portion having a first portion top end and a first portion bottom end;
a second portion connected to the first portion bottom end, wherein the second portion comprises a second portion proximal end and a second portion distal end, and wherein the second portion proximal end is connected to the first portion bottom end; and
a third portion connected to the second portion distal end, wherein the third portion is round in shape to secure the rope to removably attach the device to the livestock backrubber,
wherein the first portion is offset to a first side of the first end cap or the second end cap and the third portion is located at a center portion of the first end cap or the second end cap, and
wherein the first portion top end is an open end that receives the rope to removably attach the device to the livestock backrubber.

19. A system comprising:
a livestock backrubber having a rope that attaches the livestock backrubber to an external item;
a device configured to removably attach to the rope of the livestock backrubber, wherein the device comprises:
a U-shaped elongated tube having a tube proximal end and a tube distal end;
a first end cap located at the tube proximal end; and
a second end cap located at the tube distal end,
wherein:
each of the first end cap and the second end cap comprises a cut-out configured to removably attach the device to the livestock backrubber, and the cut-out comprises:
a first portion having a first portion top end and a first portion bottom end;
a second portion connected to the first portion bottom end, wherein the second portion comprises a second portion proximal end and a second portion distal end, wherein the second portion proximal end is connected to the first portion bottom end; and
a third portion connected to the second portion distal end, wherein:
a first portion longitudinal axis is perpendicular to a second portion longitudinal axis, and
the third portion comprises a round portion to secure the rope to removably attach the device to the livestock backrubber.

* * * * *